United States Patent Office 3,449,415
Patented June 10, 1969

3,449,415
PURIFICATION OF FORMIC ACID AND
PROPIONIC ACID
Ben W. Kiff, Ona, W. Va., assignor to Union Carbide
Corporation, a corporation of New York
No Drawing. Filed Dec. 12, 1966, Ser. No. 600,751
Int. Cl. C07c 51/42, 53/22, 53/02
U.S. Cl. 260—540                      5 Claims

ABSTRACT OF THE DISCLOSURE

The invention relates to a process for the purification of certain low molecular weight acids, namely formic acid and propionic acid, to remove minute amounts of color forming impurities. Purification is achieved by treating the organic acid with minor amounts of urea at elevated temperatures as set forth in the following specification. Formic acid and propionic acid are known compounds of known utility.

In the commerical synthetic methods for the production of formic acid and propionic acids by the oxidation of aliphatic alkanes, complex mixtures are produced that are subsequently resolved into their separate components by the use of complex series of extractions and distillations. Notwithstanding the extensive procedures used to separate the formic acid and propionic acid from the complex reaction mixtures trace amounts of impurities do remain in the acids and present problems.

The liquid phase oxidation of aliphatic alkanes containing from 3 to about 6 carbon atoms is an important commercial process for the manufacture of a plurality of valuable oxygenated compounds. The hydrocarbon oxidation reaction produces a mixture of products in which acetic acid is usually present in largest amount together with several other components, such as acids, ethers, ketones, aldehydes, etc. The individual components in this mixture are separable by means of a complicated series of extractions and distillations and among the products obtained and recovered are formic acid and propionic acid.

While formic acid and propionic acid can be recovered and refined to yield products having a fairly high purity in excess of 95 percent, the refined distilled acids contain small amounts of deleterious impurities which cannot be removed by the physical means of exrtaction and distillation normally employed.

The formic acid recovered from the hydrocarbon oxidation by distillation contains trace amounts, usually in the order of parts per million, of unknown impurities which cause the formation of an undesirable color in the formic acid on storage. All previous attempts to remove these impurities have been without avail. As a result, commercial use of formic acid obtained by the oxidation process has been restricted to those applications in which the presence of color is not critical, or to those applications involving the immediate use of the formic acid after distillation.

The propionic acid recovered from the hydrocarbon oxidation reaction by distillation contains impurities that produce a brown color upon addition of sulfuric acid. In addition, this distilled propionic acid contains several impurities that have boiling points very close to that of propionic acid and consequently cannot be removed completely from the propionic acid by the physical purification means; their presence in these minor amounts prevents the propionic acid from passing commercial specifications. The chief impurities known to be present are acrylic acid and unsaturated ketones such as methyl propenyl ketone and methyl butenyl ketone, together with other low boiling contaminants. The semi-refined distilled propionic acid generally contains from about 0.5 to about 1 percent acrylic acid and from about 0.01 to about 0.3 percent of the unsaturated ketones and other low boiling contaminants. While these are the general ranges of the impurities found in the distilled semi-refined propionic acid, the crude material initially obtained generally has a propionic acid content of less than about 75 percent by weight.

It has now been found that the addition of urea to formic acid or propionic acid and subsequently heating the mixture at an elevated temperature will yield acids of acceptable commercial high purity that is essentially free of the color forming impurities.

In the process of this invention urea is added to the crude or semi-refined formic acid or propionic acid obtained from the hydrocarbon oxidation reaction and the mixture is heated for an appreciable period of time. The acid is then distilled and recovered in the desired high purity.

The amount of urea required is dependent upon the quantity of impurities present in the starting material. Generally, this amount is at least about twice the stoichiometric amount of the total amount of the impurities present. The concentration of urea used ranges from about 0.2 percent to about five percent by weight of the acid treated; the preferred concentration is from about 0.25 percent to two percent by weight. Larger amounts can be used if desired but the excess urea does not serve any practical purpose; smaller amounts are not as effective.

The mixture of propionic acid and urea is heated at a temperature of from about 100° C. to about 200° C., or higher; preferably from about 120° C. to about 150° C. The pressure is not critical, and the mixture can be heated at atmospheric or super-atmospheric pressure.

Mixtures of formic acid and urea are heated at a temperature of from about 40° C. to about 150° C., or higher; preferably from about 70° C. to about 100° C.; again, pressure is not critical.

The organic acid-urea reaction mixture is heated for a period of time dependent upon whether the organic acid is formic acid or propionic acid. It has been found that a longer heating period is necessary for propionic acid. The heating period can be from 15 minutes to about 35 hours for formic acid and is preferably from about 30 minutes to about 24 hours, at the indicated temperatures therefor. In the case of propionic acid the reaction mixture is preferably heated at the indicated temperatures therefor for at least about 16 hours, and most preferably from about 16 hours to about 40 hours. In either case longer heating periods can be employed with no deleterious effects and slightly shorter periods can be used where a lesser degree of purity is adequate. Shorter heating periods can be effective at higher temperatures. In general as the temperature is increased the time can be decreased. However, it is preferred to operate within the ranges set forth above. The critical factor for the heating period is that it be continued for a period of time sufficient to permit the reaction to proceed to the extent that the content of color forming impurities is decreased and that the acid that is subsequently recovered will pass the color test. This period of time will vary to some extent with the starting material and is dependent upon the concentration of impurities present and the temperature used.

It has also been found that the presence of water in the mixture of acid and urea increases the effectiveness of the treatment. The water may be added at any time, before or during the heating of the acid and urea mixture, or after the heating period but before the distillation step used to recover the purified acid. The amount of water is not critical and generally varies from about 0.25 to about ten percent by weight of the acid to be treated; preferably from about 0.5 to three percent. Higher water concentration is not desirable since it adds to the distillation costs, however, it can be used.

The purification treatment of this invention yields purified propionic acid having an oxidizables content as low as 0.03 percent, or less. The oxidizables consist of all of the unsaturated compounds and other low boiling contaminants. One of the primary tests for determining the purity of propionic acid is the hypobromite test for oxidizables content. The commercial specification limit for oxidizables for refined propionic acid is 0.05 weight percent by this test. The hypobromite test is carried out in the following manner.

A solution of 15 grams of sodium hydroxide in 50 ml. of distilled water is prepared. At room temperature 6 ml. of bromine are added and the resulting solution is diluted to two liters with distilled water. To perform the analysis, 100 ml. of distilled water, 25 ml. of the above sodium hypobromite solution and 10 ml. of a 20 percent aqueous formate-free sodium acetate solution are added in the stated order to two 250 ml. glass stoppered Erlenmeyer flasks. Into one flask 10 ml. of the propionic acid sample are added. The second flask is reserved as a blank. The two flasks are allowed to stand at room temperature for 15 minutes and 5 ml. of 25 percent aqueous potassium iodide and 10 ml. of concentrated hydrochloric acid are added to each flask. They are then titrated with 0.1 N sodium thiosulfate to the disappearance of the brown color and the percent oxidizables determined with the following formula:

$$\frac{(B-A) \, N \times 2.3}{10 \times \text{sp. gr.}} = \text{percent oxidizables}$$

A=ml. of N normal sodium thiosulfate required for the sample.
B=ml. of N normal sodium thiosulfate required for the blank.

The presence of color forming bodies in propionic acid is determined by adding 6 ml. of 98 percent sulfuric acid to 100 ml. of the propionic acid at 20° C. and then comparing the color formed after one hour at 20° C. with a set of color standards.

With formic acid, the presence of color forming impurities is determined by placing a sample of the formic acid in a brown bottle and heating at 60° C. The color of the acid is then compared daily with the conventional color standards and the acid is considered satisfactory if the color is not darker than 40 Pt-Co after 168 hours at 60° C. It has been found that since the usual commercial storage conditions are much milder than those used in the accelerated test, a color of 40 Pt-Co after heating for 168 hours at 60° C., is a reasonable correlation with 20 Pt-Co for prolonged storage at ambient conditions, which is its color specification generally desired for commercial refined formic acid.

Previously propionic acid has been purified by reaction with expensive oxidizing agents, such as potassium permanganate or sodium dichromate. This procedure was undesirable because of the large amounts of oxidizing agent that were necessary and the reaction of the propionic acid with the metal compound to form the corresponding metal propionate. Another procedure that has been used has been to catalytically hydrogenate the mixture so as to reduce the unsaturated compounds. However, the excessive equipment and catalyst costs have been a deterrent; the starting material generally contains impurities that poison the catalyst within a short time. Further, hydrogenation has not been successful in removing the trace amounts of color forming impurities present.

The following examples further serve to illustrate this invention.

Example 1

In this experiment semi-refined propionic acid obtained from a butane oxidation reaction that had the following composition was used as the starting material.

| | Percent |
|---|---|
| Propionic acid | 98.15 |
| Acrylic acid | 0.70 |
| Combined low boiling compounds | 0.75 |
| Water | 0.40 |
| Oxidizables (by hypobromite analysis) | 0.63 |

Color on sulfuric acid test, too dark to measure.

To a flask there were charged 600 g. of the semi-refined propionic acid, 12 g. of urea (2 percent by weight of the propionic acid) and 30 g. of water (5 percent by weight of the propionic acid). This mixture was heated for 16 hours at 122° C., transferred to a still with a 45 plate Oldershaw column, and distilled. A heads cut, 10 percent by weight of the charge, was collected at a reflux ratio of 10 to 1 and discarded. The main portion of the distillate, amounting to 83 percent of the charge, was collected at a reflux ratio of 3 to 1. The purified propionic acid had an oxidizables content of 0.05 percent and had a sulfuric acid color test of only 10 Pt-Co.

Example 2

To 500 g. of the semi-refined propionic acid described in Example 1 there was added 10 g. of urea and the mixture was heated at 125° C. for 120 hours. There was then added 25 g. of water and the mixture was distilled through a 45 plate Oldershaw column at 100 mm. A heads cut of 117 g. was collected at a reflux ratio of 5 to 1 and discarded. A main cut of 328 g. was then recovered at a reflux ratio of 2 to 1. The oxidizables content of the propionic acid, as determined by sodium hypobromite analysis, was 0.05 percent; the sulfuric acid color test was 10 Pt-Co.

To 500 g. of the semi-refined propionic acid described in Example 1 there were added 10 g. urea and 25 g. of water. The mixture was heated for 120 hours at 125° C. and was then distilled through a 45 plate Oldershaw column at 100 mm. After a heads cut of 144 g. was removed and discarded, a main cut of 308 g. of refined propionic acid was collected. This material contained only 0.03 percent oxidizables by analysis with sodium hypobromite; the sulfuric acid color test was only 5 Pt-Co.

Example 4

To 2000 g. of the semi-refined propionic acid described in Example 1 there were added 40 g. of urea and 100 g. water. The mixture was heated for 24 hours at 123° and then distilled at 100 mm. through a 45 plate Oldershaw column. A heads cut of 224 g. was removed at a reflux ratio of 10 to 1 and discarded a total of 1625 g. of purified propionic acid was collected at a reflux ratio of 2 to 1. This main fraction contained 0.04 percent oxidizables when analyzed by the sodium hypobromite method; the sulfuric acid color test was 10 Pt-Co.

Example 5

To 1000 g. of the semi-refined propionic acid described in Example 1 there were added 50 g. water and 20 g. urea. After the mixture was heated at 115 to 120° C. for 144 hours it was distilled through a packed column 2 feet long with a diameter of one inch. After heads cut of 104 g. was removed and discarded a main cut of 758 g. of purified propionic acid was collected. This material contained 0.03 percent oxidizables when analyzed by the sodium hypobromite method; the sulfuric acid color test was 10 Pt-Co.

Example 6

In this experiment crude propionic acid obtained as a bottom stream from the acetic acid distillation column of a butane oxidation product was used. This crude had the following composition:

| | Percent |
|---|---|
| Propionic acid | 73.27 |
| Formic acid | 0.11 |
| Acetic acid | 9.75 |
| Water | 0.02 |
| Combined butyrolactone, acrylic acid, butyric acid and low boilers | 16.33 |
| Oxidizables | 0.78 |

Color on sulfuric acid test, too dark to measure.

To 500 g. of this crude propionic acid there were added 10 g. of urea and 25 g. of water. The mixture was heated at 122° C. for 24 hours and then distilled through a 45 plate Oldershaw column at 150 mm. A heads cut of 96 g. was removed at a reflux ratio of 10 to 1 and discarded. The propionic acid cut weighing 279 g. was distilled at a reflux ratio of 3 to 1. This purified propionic acid had an oxidizables content of 0.05 percent and it passed the sulfuric acid color test with a value of 10 Pt-Co.

Example 7

The process of the invention was carries out in a continuous manner in the laboratory. The semi-refined propionic acid used as the starting material had the following composition:

| | Percent |
|---|---|
| Propionic acid | 97.2 |
| Acetic acid | 0.95 |
| Acrylic acid | 0.68 |
| Water | 0.40 |
| Combined other impurities | 0.77 |
| Oxidizables | 0.80 |

Color on sulfuric acid test, too dark to measure.

Two five liter flasks, equipped with stirrers and condensers, were connected so that the first would overflow into the second; the second flask was in turn connected to the side of a 40 plate Oldershaw column at a point that was 10 trays from the bottom.

A solution of the above semi-refined propionic acid containing 2 percent urea and 2 percent water was prepared. The flasks were charged with 7,130 g. of the propionic acid/urea/water solution and heated at 125° C. for 36 hours. Thereafter the temperature was maintained at 125° C. while additional propionic/urea/water solution was pumped into the first flask at a rate of 205 g. per hour. This provided an average residence time of 35 hours in the reaction vessels. As the solution was pumped into the first flask, solution overflowed into the second reactor at the same rate and from thence to the still. The still was operated at 150 mm. with a 10 to 1 reflux ratio. A heads cut of about 10 percent was removed and the remainder, which was purified propionic acid, was withdrawn from the base of the column at a steady rate. The purified propionic acid so withdrawn was analyzed for oxidizables content 7.5, 23, 32 and 48 hours after feed to the still was started and in each instance the oxidizables content was only 0.05 percent; the color by sulfuric acid test was 10 Pt-Co.

Example 8

In this experiment semi-refined propionic acid having the following composition was used:

| | Percent |
|---|---|
| Propionic acid | 98.2 |
| Oxidizables content | 0.63 |

Color by sulfuric acid test, too dark to measure.

Urea was added to give a concentration thereof of two percent by weight of the propionic acid, the mixture was heated and samples were removed, distilled and tested at various times. The results are set forth below:

| Reaction time, hrs. | Oxidizables in product, percent | Sulfuric acid test |
|---|---|---|
| 0 | 0.63 | Fail |
| 3 | 0.34 | Fail |
| 16 | 0.10 | Pass |
| 40 | 0.06 | Pass |

The addition of one percent urea to this semi-refined propionic acid at 80° C. followed by immediate vacuum distillation yielded a distilled propionic acid that had an oxidizables content of 0.60 percent. The sulfuric acid test produced a dark color.

The addition of two percent urea and five percent water to this semi-refined propionic acid at 146° C. followed by immediate vacuum distillation yielded a product that had an oxidizables content of 0.13 percent but which developed a dark color by the sulfuric acid test.

When two percent urea was added to this semi-refined propionic acid and the mixture was heated for 4 hours at various temperatures the oxidizables content decreased as the heating time increased; however, the recovered propionic acid failed to pass the sulfuric acid color test.

| Temperature, ° C. | Oxidizables in product, percent | Sulfuric acid test |
|---|---|---|
| 75 | 0.57 | Fail |
| 135 | 0.14 | Fail |
| 141 | 0.07 | Fail |

Even the use of five percent urea failed to produce a propionic acid product that would pass the sulfuric acid color test after only four hours of heating. In this instance while the oxidizables content was decreased from 0.63 percent to 0.07 percent, the color forming impurities were not removed.

These results, set forth in Example 8 and the intervening paragraphs immediately preceding this paragraph, show that propionic acid having a low oxidizables content and that will pass the sulfuric acid color test can only be obtained with the use of both urea and a prolonged heating period. While the addition of urea alone does, in some instances show a decrease in oxidizables content without the heating step, the propionic acid recovered does not pass the sulfuric acid color test.

Other additives, such as sodium acetate, zinc chloride, ammonium chloride, aqueous ammonia, dilute sulfuric acid, air, etc. can be present in the propionic acid mixture but they have not shown any advantage over the process as described.

In a pair of experiments in which two percent urea and five percent water were added to the semi-refined crude used in Example 8, the mixtures were heated at 125° C. for 96 hours and 120° C. for 144 hours. The purified propionic acid was recovered by atmospheric distillation and these acids had oxidizables contents of 0.02 percent and 0.03 percent, respectively. They both passed the sulfuric acid color test.

Example 9

Semi-refined formic acid of 99.5 percent purity and containing a total of about 0.5 percent acetic acid and water and about 20 parts per million of unknown color forming impurities was placed in a flask and two percent by weight thereof of urea was added. The mixture was heated at 100° C. for one hour and then distilled to recover the purified formic acid. The purified formic acid was tested for presence of color forming impurities by the procedure hereinbefore described. At the same time, the untreated semi-refined formic acid was similarly tested for control purposes. The results are tabulated following Example 10.

Example 10

A mixture of the same semi-refined formic acid containing one percent urea and two percent added water was heated at 100° C. for one hour, distilled, and tested for the presence of color forming impurities. The results are set forth below.

| Example | Control | 9 | 10 |
|---|---|---|---|
| Pt-Co color after heating at 60° C., No. of hours: | | | |
| 0 | 40 | 10 | 0 |
| 24 | 50 | | |
| 48 | 80 | | |
| 72 | 1-Gardner | 20 | 5 |
| 96 | | 25 | 10 |
| 240 | | 40 | 15 |

The data shows that the control failed the color test shortly after it was started and after 72 hours of heating the Pt-Co color series could no longer be used; the much darker Gardner series of color standards was necessary. The formic acid purified by the instant invention did not develop an unsatisfactory color even after heating for 240 hours (10 days).

What is claimed is:

1. A process for purifying a member selected from the group consisting of formic acid and propionic acid obtained by the oxidation of the aliphatic alkanes containing from 3 to about 6 carbon atoms which comprises adding from about 0.2 percent to about five percent by weight of urea to said acid, heating the mixture at a temperature above 40° C. for a period of time from 15 minutes to about 35 hours when formic acid is said acid and at least about 16 hours when propionic acid is said acid sufficient to react with the oxidizables and color forming impurities initially present, and subsequently recovering the purified acid.

2. A process as claimed in claim 1 wherein the mixture of propionic acid and urea is heated at from about 120° C. to about 150° C. for a period of at least about 16 hours.

3. A process as claimed in claim 2 wherein water is added to the mixture.

4. A process as claimed in claim 1 wherein the mixture of formic acid and urea is heated at from about 40° C. to about 150° C. for a period of at least about 0.25 hour.

5. A process as claimed in claim 4 wherein water is added to the mixture.

References Cited

UNITED STATES PATENTS 2,598,953   6/1952   Weitkamp et al. _____ 260—540
2,569,984   10/1951   Fetterly _____ 260—540

LORRAINE A. WEINBERGER, *Primary Examiner.*

V. GARNER, *Assistant Examiner.*

U.S. Cl. X.R.

260—542, 533